United States Patent [19]

Zuppinger

[11] 4,220,731

[45] Sep. 2, 1980

[54] PROCESS FOR THE PREPARATION OF CROSSLINKED HIGH POLYMERS

[75] Inventor: Paul Zuppinger, Arlesheim, Switzerland

[73] Assignee: Ciba-Geigy Corporation, Ardsley, N.Y.

[21] Appl. No.: 913,420

[22] Filed: Jun. 7, 1978

[30] Foreign Application Priority Data

Jun. 14, 1977 [CH] Switzerland .................. 7296/77

[51] Int. Cl.$^2$ .................. C08L 63/00; C08G 18/58
[52] U.S. Cl. .................. 521/156; 525/452; 525/439; 528/73
[58] Field of Search .................. 260/830 P; 528/73; 521/156

[56] References Cited

U.S. PATENT DOCUMENTS

| | | | |
|---|---|---|---|
| 2,935,488 | 5/1960 | Phillips | 528/73 |
| 3,198,851 | 8/1965 | Hoy | 528/73 |
| 3,242,108 | 3/1966 | McGary | 260/830 P |
| 3,571,442 | 10/1969 | DiLeone | 528/73 |
| 3,817,918 | 6/1974 | Aufdermarsh | 528/73 |
| 3,984,376 | 10/1976 | Yokono | 260/831 |
| 4,022,721 | 5/1977 | Ashida | 260/2.5 AC |
| 4,070,416 | 1/1978 | Narahara | 260/830 P |
| 4,118,373 | 10/1978 | Orvik | 528/73 |
| 4,128,531 | 12/1978 | Toyoda | 528/73 |
| 4,129,554 | 12/1978 | Karasawa | 528/73 |
| 4,130,546 | 12/1978 | Goto | 528/73 |
| 4,138,372 | 2/1979 | Nishikawa | 528/73 |

OTHER PUBLICATIONS

Frisch, K. C. et al., Advances in Urethane Technology, vol. 2, pp. 241-268.
Lee et al., Handbook of Epoxy Resins, McGraw-Hill Book Co., New York, (1967), pp. 11-12 to 11-18.
May et al., Epoxy Resins, Marcel Dekker, New York, (1973), 293-296.

*Primary Examiner*—Paul Lieberman
*Attorney, Agent, or Firm*—Harry Falber

[57] ABSTRACT

The invention relates to a process for the preparation of crosslinked polymers by reacting liquid epoxide compounds and polyisocyanates and, if desired, polyhydroxy compounds. The curing catalysts used are complex compounds of $BF_3$ with ethers or phosphonium compounds or $H_2O$. If desired, a compound of one of the metals Sn, Zn or Fe which is soluble in the reaction mixture is also added.

In most cases it is possible to dispense completely with the external supply of heat when carrying out the process according to the invention, since the reaction is sufficiently exothermic. The technical advance lies in the fact that it is largely possible to dispense with heating and insulating equipment when carrying out the reaction industrially. Despite this, astonishingly high glass transition temperatures are obtained.

12 Claims, No Drawings

PROCESS FOR THE PREPARATION OF CROSSLINKED HIGH POLYMERS

It is already known from U.S. Pat. No. 3,198,851 and from German Offenlegungsschrift No. 2,545,106 to prepare cured high polymers by reacting polyepoxide compounds with polyisocyanates in the presence of catalysts. According to the first-mentioned U.S. Patent Specification, a $BF_3$/amine complex is used as the catalyst and the end products are obtained in the form of laminates, castings, mouldings or the like. The polymers according to the said German Offenlegungsschrift are distinguished in particular by good resistance to thermal shock.

Binary reaction systems similar to the mixtures described in the abovementioned prior art are also claimed in German Offenlegungsschrift No. 2,359,386. Tertiary amines, morpholine derviatives and imidazole derivatives are presented as particularly effective catalysts for the curing of these mixtures.

A further development of the invention according to German Offenlegungsschrift No. 2,359,386 is given, in practice, by German Auslegeschrift No. 2,430,426, which claims curable compositions which contain polyisocyanates masked by epoxyphenol compounds, and, if desired, additional polyepoxy compounds, and, as catalysts, the same basic catalysts which have already been mentioned in German Offenlegungsschrift No. 2,359,386, or similar basic catalysts.

The formation of the polymers during curing of the mixtures according to all of the abovementioned specifications of the prior art is, as is known, based essentially on the formation of oxazolidone and isocyanurate bonds. These facts are also singled out in detail in the last two specifications discussed. Moreover, in German Auslegeschrift No. 2,430,426 it is stated in particular, in column 9, lines 45 to 51, that only basic catalysts are suitable for curing the moulding compositions claimed. Acid catalysts, on the other hand, are said to be unsuitable for forming isocyanurate and oxazolidone bonds.

The non-suitability of acid catalysts for the formation of oxazolidone groups is confirmed, using $BF_3$ etherates as an example, in Table 4 on page 260 (Experiment 9) of a publication by K. Ashida and K. C. Frisch "Modified Isocyanurate Foams" in the textbook "Advances in Urethane Science and Technology", Volume 2 (Technomic Publishing Inc., 1973). Sn octoate and dibutyl-tin dilaurate are also shown (by experiments 10 and 11) to have no effect. The salts $AlCl_3$, $FeCl_3$ and $ZnCl_2$, which have an acid reaction, are, on the other hand, declared to be effective catalysts, which is in contrast to the statements in German Auslegeschrift No. 2,430,426.

The reaction of ternary systems (polyepoxide compound, polyisocyanate and polyhydroxy compound) in the presence of $BF_3$/amine complexes is also known from U.S. Pat. No. 3,242,108. This type of reaction results, with simultaneous formation of isocyanurate, oxazolidone and urethane bonds, in polymers which have a good stability to heat and can be foamed. With regard to the formation of the isocyanurate and oxazolidone groups and the catalytic influence thereof, what has been stated in respect of the binary systems which have been discussed applies in the case of the reactions described in the said U.S. patent specification.

The present invention relates to a process for the preparation of crosslinked polymers by reacting liquid epoxide compounds, containing at least two epoxide groups in the molecule, and polyisocyanates and, if desired, polyhydroxy compounds in the presence of curing catalysts at temperatures between room temperature and 250° C., which comprises using, as the curing catalyst, a complex compound of $BF_3$ with a compound of the group comprising ethers, phosphonium compounds and $H_2O$, if desired together with a compound of a metal of the group comprising Sn, Zn and Fe, which compound is soluble in the reaction mixture.

$BF_3$ complexes suitable as curing catalysts for the process according to the invention are, in particular, $BF_3$ etherates of cyclic ethers, such as tetrahydrofurane and tetrahydropyrane. Suitable complex compounds of $BF_3$ with phosphonium compounds are, for example, those based on triethyl phosphate and trimethyl phosphonate. Boron trifluoride dihydrate ($BF_3.2H_2O$) is also an effective curing agent for the reactants used according to the invention.

The compounds of the metals Sn, Zn and Fe, which can be admixed to the reaction mixture if desired, act as accelerators for the curing catalysts. The following compounds are suitable examples: dibutyl-tin dilaurate, Zn naphthenate, Zn octoate, Fe naphthenate and Fe octoate.

The following epoxide compounds are particularly suitable for the process according to the invention: epoxidised diolefins, dienes or cyclic dienes, such as butadiene dioxide, 1,2,5,6-diepoxyhexane and 1,2,4,5-diepoxycyclohexane; epoxidised diolefinically unsaturated carboxylic acid esters, such as methyl 9,10,12,13-diepoxystearate; the dimethyl ester of 6,7,10,11-diepoxyhexadecane-1,16-dicarboxylic acid; and epoxidised compounds containing two cyclohexenyl radicals, such as diethylene glycol bis-(3,4-epoxycyclohexanecarboxylate) and 3,4-epoxycyclohexylmethyl 3,4-epoxycyclohexanecarboxylate.

Further compounds which can be used are polyglycidyl esters such as are accessible by reacting a dicarboxylic acid with epichlorohydrin or dichlorohydrin in the presence of alkali. Such polyesters can be derived from aliphatic dicarboxylic acids, such as oxalic acid, succinic acid, glutaric acid, adipic acid, pimelic acid, suberic acid, azelaic acid and sebacic acid, and especially from aromatic dicarboxylic acids, such as phthalic acid, isophthalic acid, terephthalic acid, tetrahydrophthalic acid, hexahydrophthalic acid, 2,6-naphthylene-dicarboxylic acid, diphenyl-o,o'-dicarboxylic acid, ethylene glycol bis-(p-carboxyphenyl) ether and others. Examples are diglycidyl adipate and diglycidyl phthalate and also diglycidyl esters which are of the average formula:

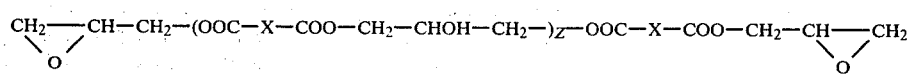

in which X is an aromatic hydrocarbon radical, such as a phenyl radical, and Z is a low number and is an integer or fraction.

Further compounds which can be used are polyglycidyl ethers such as are accessible by etherification of a dihydric or polyhydric alcohol or diphenol or polyphenol with epichlorohydrin or dichlorohydrin in the presence of alkali. These compounds can be derived from glycols, such as ethylene glycol, diethylene glycol, triethylene glycol, 1,2-propylene glycol, 1,3-propylene glycol, 1,4-butylene glycol, pentane-1,5-diol, hexane-1,6-diol, hexane-2,4,6-triol and glycerol, and especially from diphenols or polyphenols, phenol novolacs or cresol novolacs, resorcinol, pyrocatechol, hydroquinone, 1,4-dihydroxynaphthalene, phenol/formaldehyde condensation products, bis-(4-hydroxyphenyl)-methane (bisphenol F), bis(4-hydroxyphenyl)-methylphenylmethane, bis-(4-hydroxyphenyl)tolylmethane, 4,4'-dihydroxydiphenyl, bis-(4-hydroxyphenyl)sulphone and especially 2,2-bis-(4-hydroxyphenyl)-propane (bisphenol A). Such ethers are ethylene glycol diglycidyl ether and resorcinol diglycidyl ether and also diglycidyl ethers which are of the average formula:

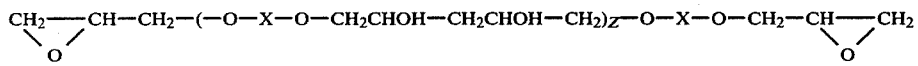

in which X is an aromatic radical and Z is a low number and is an integer or fraction.

Particularly suitable epoxy compounds are epoxy resins which are liquid at room temperature, for example those obtained from 4,4'-dihydroxydiphenyl-dimethylmethane, and have an epoxide content of about 3.8–5.8 epoxide equivalents per kg. Epoxy resins of this type are, for example, of the average formula:

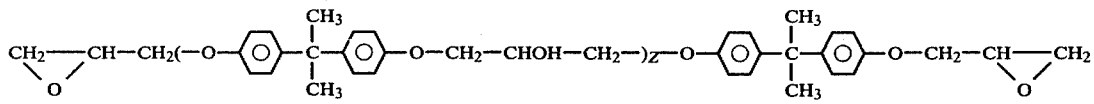

in which Z is a small number and is an integer or fraction, for example between 0 and 2.

However, mixtures of specific liquid epoxy resins can also be used.

The use of the epoxide compounds listed is a distinct preferred embodiment of the process according to the invention.

Polyisocyanates which can be employed according to the invention are of both aromatic and aliphatic types. Diphenylmethane diisocyanate and 2,2,4-trimethylhexamethylene diisocyanate are very suitable.

Polyhydroxy compounds which can be employed according to the invention are linear or branched polyether-polyols and/or polyester-polyols which contain primary and/or secondary hydroxyl groups and are of low to medium viscosity.

Polyether-polyols are obtained by known processes by reacting polyhydric starter molecules, such as ethylene glycol, propylene glycol, glycerol, 1,4-butanediol, trimethylolpropane, pentaerythritol, sorbitol, hexanetriol and the like, or mixtures thereof, with ethylene oxide and/or propylene oxide.

Polyester-polyols form by known processes from the reaction of polyalcohols of the type mentioned above under starter molecules and under polyether-polyols, or mixtures thereof, with organic, saturated and/or unsaturated polycarboxylic acids, or mixtures thereof, of the type of adipic acid, sebacic acid, phthalic acid, tetrahydrophthalic acid, hexahydrophthalic acid, maleic acid, fumaric acid and the like.

If, according to the invention, only 2 reactants, i.e. a liquid epoxide compound containing at least two epoxide groups in the molecule and a polyisocyanate, are reacted, the ratio is so chosen that there are 0.1 to 2.0 and preferably 0.3 to 1.2 isocyanate groups per epoxide group and the BF$_3$ of the curing catalyst is present in a concentration of 0.2 to 0.5% by weight, based on the amount of both reactants. If the reaction mixture additionally also contains a polyhydroxy compound (ternary system), the ratios in respect of the epoxide compound and the polyisocyanate are the same as in the case of the binary systems according to the invention. The polyhydroxy compound is present in the system in a concentration such that there are 0.1 to 2.0 and preferably 0.2 to 1.0 OH groups per epoxide group. As in the case of the binary systems, the BF$_3$ of the curing catalyst is contained in a concentration of 0.2 to 0.5% by weight, but in this case the percentages are based on the amount of all three reactants.

In the process according to the invention, the concentration of the Sn, Zn or Fe compound which is soluble in the reaction mixture is 0.0001 to 0.5 and preferably 0.0002 to 0.3% by weight in both the binary and the ternary system, the percentages being based on the amount of the 2 or the 3 reactants respectively.

In the case of ternary systems, the procedure can be for all 3 reactants to be present in the reaction mixture when the reaction is initiated. In principle, however, it is also possible to proceed stepwise; i.e. prepolymers of two reactants are first prepared and the reaction is then brought to completion after adding the third component.

In the single stage procedure (i.e. without the use of prepolymers) it is advantageous first to carry out premixing and to prepare a "curing agent component" and, if desired, a "resin component". In the case of binary systems, the "curing agent component" consists of the polyisocyanate or proportions thereof and the curing catalyst and, if desired, the Sn, Zn or Fe compound. The "resin component" in this case consists either of the epoxide resin or of a mixture of the epoxide resin with the remainder of the polyisocyanate. In the case of ternary systems, the "curing agent component" consists either of the polyisocyanate and the curing catalyst and, if desired, of the metal compound or, alternatively, of the polyhydroxy compound and the curing catalyst and, if desired, the metal compound. The "resin component" in this case of ternary systems correspondingly consists either of a mixture of the epoxide compound with the polyhydroxy compound or, alternatively, of a mixture of the epoxide compound with the polyisocyanate. The latter mixture, however, has the disadvantage that it is not very stable on storage in those cases in which the epoxide compound also contains hydroxyl groups.

In principle, the Sn, Zn or Fe compound can also be present in the "resin component". Both the "resin component" and the "curing agent component" can, of course, also contain customary neutral modifiers or assistants which do not react with, or chemically change, either the main reactants or the curing catalyst. Modifiers and assistants include, for example, inert extenders, fillers and reinforcing agents, pigments, dyes, organic solvents, thixotropic agents, flame retardants and mould release agents.

The addition of such modifiers or assistants is, however, not restricted to the specific procedure using resin and curing agent components but can also be made according to the invention in every case, i.e. also in all other procedures of the invention.

The process according to the invention is suitable preferably for the production of castings. In principle, however, the production of foams, laminates and mouldings is also possible.

In experiments with the reaction mixtures used according to the invention it is immediately apparent that the compounds containing $BF_3$ which are specifically employed accelerate the reaction, in comparison with known systems. A distinct additional synergistic effect, especially in the case of binary systems, arises when the mixtures also contain a compound of a metal from the group comprising Sn, Zn and Fe, in addition to the curing catalyst.

In most cases it is possible to dispense completely with the external supply of heat when producing casting resins or manufacturing foams, since the exothermic reaction ensures adequate through-curing. With regard to the industrial reaction vessels and metering and mixing devices, this of course signifies a considerable technical advance in respect of heating and insulating equipment. The adequate through-curing of such casting systems and foam systems without the external supply of heat has the effect that astonishingly high glass transition temperatures (for example of 160° C.) are obtained and this results, for example, in good electrical values, outstanding heat distortion resistance and high hardness. In the case of these last-mentioned systems, however, a minimum amount of reaction mixture is necessary and this is generally about 25 to 30 g if substantial dissipation of heat to the surroundings is prevented.

However, the process according to the invention is not restricted to systems with which no external supply of heat is necessary. For some specific admixtures and concentrations it is necessary to prewarm the casting moulds or foaming cavities to temperatures above room temperature, for example to 10° to 50° C., before introducing the reactive compositions. For even more sluggish systems, even higher temperatures and subsequent heating can also be necessary. It is astonishing that in most cases highly advantageous glass transition temperatures are obtained. In the case of the production of resins, it is also striking that, in contrast to known systems, no problems due to bubble formation arise.

When using the process according to the invention, the pot life is adjustable in a controlled manner within a wide range by metering the reactants, the curing catalysts, the fillers and the ratios.

When producing foams, halogenated hydrocarbons which vaporise easily, for example trichloromonofluoromethane, can be added to the reaction mixture. However, foaming can also be achieved by the addition of small amounts of water, which, as is known, reacts with isocyanates with the elimination of $CO_2$.

EXAMPLES

Examples 1 to 9 (binary systems)

40 Parts by weight (g) of a liquid diglycidyl ester (A) based on tetrahydrophthalic acid and having an epoxide equivalent weight of 150–167 and a viscosity (25° C.) of 400–700 cP are mixed intensively in a 100 $cm^3$ paper cup with 20 parts by weight (g) of diphenylmethane diisocyanate (mixture of isomers) with a NCO content of 30% and a viscosity (25° C.) of 130 cP, into which the particular catalyst systems listed in Table 1 have been mixed beforehand, and the mixtures are assessed as indicated in Table 1 in respect of the gel time at room temperature, the temperature rise, the glass transition temperature (GTT) and the appearance of the cured reactive composition.

In each case 0.33% by weight of $BF_3$ and/or 0.00025 to 0.25% by weight of dibutyl-tin dilaurate are employed in the total mixture, i.e. resin plus curing agent, and in each case the $BF_3$ is in the form of the complex-forming agents listed in Table 1.

Table 1

| Example No. | Curing catalyst | Gel time (pot life) | Maximum temperature rise °C. minute | GTT °C. | Assessment in respect of bubble formation in the compositions |
|---|---|---|---|---|---|
| 1 (CE)* | none | >hours | — | <20 | extensive |
| 2 | $BF_3$, 50% in tetrahydrofurane | 30 mins. | 55/30 | 47 | none |
| 3 | $BF_3$, 25% in tetrahydrofurfuryl alcohol | ~3 hours | 40/30 | 41 | none |
| 4 | $BF_3$, 25% in triethyl phosphate | 40 mins. | 45/30 | ~40 | none |
| 5 | $BF_3$, 50% in tetrahydrofurane + 0.0025% by weight of dibutyl-tin dilaurate | 11 mins. | >200/15 | 160 | none |
| 6 | $BF_3$, 50% in tetrahydrofurane + 0.00025% by weight of dibutyl-tin dilaurate | 17 mins. | >200/27 | 132 | none |
| 7 (CE) | $BF_3$, 65.9% in monoethylamine | >24 hours | 30/30 | <20 | medium-extensive |
| 8 (CE) | dibutyl-tin dilaurate | >10 hours | 38/8 | <20 | extensive |
| 9 (CE) | $BF_3$, 65.9% in monoethylamine + dibutyl-tin dilaurate (0.25% by weight) | ~4 hours | 50/45 | <20 | very extensive |

*CE signifies "comparison example"

The experiments show on the one hand that the reaction mixtures which contain the curing catalysts, according to the invention, based on $BF_3$/cyclic ethers and/or phosphoric acid esters and in some cases contain metal compounds (Examples 2 to 6) have pot lives of different lengths and on the other hand, in particular, that when the specific curing catalysts are used according to the invention, the cured compositions have no bubbles, in contrast to the compositions which either do not contain a curing catalyst (Example 1) or contain curing catalysts which are not those to be employed according to the invention (Examples 7 to 9). A striking feature is the high GTT in the case of the high-polymeric casting resins prepared according to the invention which contain only catalytic amounts of the accelerating metal compounds.

Example 10–15 (ternary systems)

30 Parts by weight (g) of a liquid diglycidyl ether (B) based on bisphenol A and having an epoxide equivalent weight of 180–195 and a viscosity (25° C.) of 8,000–12,000 cP are mixed well with 10 parts by weight (g) of a polyol which has been obtained by reacting propylene oxide and pentaerythritol in a molar ratio of 8:1 (Pluracol ® 3320 from Ugine Kuhlmann) and which has a functionality of 4, a molecular weight of 600, a viscosity (25° C.) of 1,200 cP and a hydroxyl number between 362 and 394.

40 Parts by weight (g) of this epoxy/polyol mixture are now mixed intensively in a 100 cm³ paper cup with 20 parts by weight (g) of the diisocyanate used according to Example 1, to which the curing catalysts listed in Examples 1–9 in Table 1 have been added beforehand in the amounts indicated in that table, and the mixtures are assessed in accordance with the criteria indicated in Table 2.

of the invention, result in compositions which contain a substantial number of bubbles and have relatively low glass transition temperatures.

Examples 14 clearly shows that curing catalysts which are based on complexes of $BF_3$ and cyclic ethers and additionally also contain organic tin compounds have a synergistic action on the curing or crosslinking of the composition. The reactive composition warms to above 200° C. in the course of 7 minutes and gives flawless castings.

Examples 16 to 26 (binary systems)

In the following experiments not only the epoxide resins A and B employed according to Examples 1 to 15, but also the following epoxide resins are employed, as indicated in Table 3:

Epoxide resin C: The diglycidyl ester of hexahydrophthalic acid; epoxide equivalent weight: 147 to 161; viscosity at 25° C.: 320–380 cP.

Epoxide resin D: A mixture of 70 parts by weight of epoxide resin B and 30 parts by weight of glycidyl 4-methyl-cyclohexanone-2,2,6,6-tetrapropionate with an epoxide content of 5.72 equivalents/kg.

In detail, the procedure was in each case as follows. 20 Parts by weight (g) of the isocyanate indicated in Table 2

| Example No. | Curing catalyst corresponding to Example No. | Gel time (pot life) | Maximum temperature rise °C./ minute | GTT °C. | Assessment Bubble formation in the composition |
|---|---|---|---|---|---|
| 10 | 2 | 3'20" | >200/5 | 130 | none |
| 11 | 4 | 7'15" | >200/10 | 127 | none |
| 12 (CE) | 7 | ~10 hours | 32/60 | 20 | extensive |
| 13 (CE) | 8 | 2'15" | 100/3 | 39 | extensive |
| 14 | $BF_3$, 50% in tetrahydrofurane + dibutyl-tin dilaurate | 6'30" | >200/7 | 155 | none |
| 15 (CE) | 9 | 3'50" | 95/6 | 34 | extensive |

The experiments according to Examples 10 to 15 show the following. When the reaction is carried out according to the invention (with ternary systems) (Examples 10, 11 and 14), bubble-free compositions result and astonishingly high glass transition temperatures are obtained. The latter result is particular worthy of note because there is no external supply of heat whatsoever before or during the reaction. The other experiments (Examples 12, 13 and 15), which are outside the scope Example 1, to which the curing catalysts indicated in Table 3 ($BF_3$ complex + heavy metal salt in some cases) are admixed beforehand, are added to 40 parts by weight (g) of the epoxide resin indicated in Table 3. Intensive mixing was carried out in a 100 cm³ paper cup and the mixtures were assessed in accordance with the criteria indicated in Table 3.

The concentration of $BF_3$ and the heavy metal salt is chosen as in Example 9.

Table 3

| Example No. | Epoxide resin type | Curing catalyst | Metal compound | Metal content % | Gel time pot-life hours/ minutes/ seconds | Maximum temperature rise °C./minute | GTT °C. | General assessment of the reactive composition |
|---|---|---|---|---|---|---|---|---|
| 16 | A | $BF_3$, 50% in tetrahydrofurane | — | | 30 mins. | 55/30 | 47 | clear, homogeneous |
| 17 | C | $BF_3$, 50% in tetrahydrofurane | — | | 3 hrs. | 45/10 | 33 | clear, homogeneous |
| 18 | C | $BF_3$, 50% in tetrahydrofurane | Zn naphthenate | 8 | 40 mins. | 68/20 | 47 | clear, homogeneous |
| 19 | C | $BF_3$, 50% in tetrahydrofurane | Fe naphthenate | 6 | 60 mins. | 60/15 | 39 | clear, homogeneous |
| 20 | B | $BF_3$, 25% in tetrahydropyrane | — | | 14 mins. | 152/18 | 51 | clear, homogeneous |
| 21 | B | $BF_3$, 25% in tetrahydropyrane | Zn naphthenate | 8 | 22 mins. | 175/28 | 54 | clear, homogeneous |
| 22 | B | $BF_3$, 25% in tetrahydropyrane | Fe naphthenate | 6 | 15 mins. | 150/19 | 33 | clear, homogeneous |
| 23 | D | $BF_3$, 25% in tetrahydropyrane | — | | 4 mins. 30 secs. | 107/15 | 36 | clear, homogeneous |
| 24 | D | $BF_3$, 25% in tetrahydropyrane | Dibutyl-tin dilaurate | 18.5 | 5 mins. | 114/15 | 35 | clear, homogenous |

Table 3-continued

| Example No. | Epoxide resin type | Curing catalyst | Metal compound | Metal content % | Gel time pot-life hours/ minutes/ seconds | Maximum temperature rise °C./minute | GTT °C. | General assessment of the reactive composition |
|---|---|---|---|---|---|---|---|---|
| 25 | D | BF$_3$, 25% in tetrahydropyrane | Fe naphthenate | 6 | 4 mins. 30 secs. | 125/15 | 39 | clear, homogenous |
| 26 | D | BF$_3$, 25% in tetrahydropyrane | Zn naphthenate | 8 | 5 mins. | 112/18 | 40 | clear, homogeneous |

Examples 27 to 32 (ternary systems)

The resin component I is prepared by homogeneously mixing 67.5 parts by weight (g) of diglycidyl ether (B) based on bisphenol A and mentioned in Examples 10-15 with 7.5 parts by weight (g) of diglycidyl ester (A) based on tetrahydrophthalic acid and described in Examples 1-9 and also with 25.0 parts by weight (g) of the polyether-polyol mentioned in Examples 10-15. The curing agent component II is prepared by mixing 97.25 parts by weight (g) of th diisocyanate mentioned in Examples 1-9 with 2.0 parts by weight (g) of a 48.57% solution of BF$_3$ in tetrahydrofurane and also with 0.75 parts by weight (g) of dibutyl-tin dilaurate at room temperature with the exclusion of moisture.

In each case, 160 parts by weight (g) of resin component I are now mixed well at room temperature with 80 parts by weight (g) of the curing agent component II, i.e. the components are mixed in a ratio of 2:1, and the mixture is poured rapidly into an aluminium mould (150×150×20 mm, weight 3.26 kg), the temperature of which varies from case to case, as indicated in Table 4. Cast resin sheets result which have the following properties:

Table 4

| Example No. | Mould temperature during casting °C. | Type of curing | Impact strength J cm$^{-2}$ | Flexural strength N mm$^{-2}$ | Modulus of elasticity N mm$^{-2}$ | T$_G$max °C. (modulus of shear) |
|---|---|---|---|---|---|---|
| 27 | room temperature | 1 hour in an oven at 150° C. | 0.77 | 91 | 2,630 | 165 |
| 28 | 45 | no additional external supply of heat; 5 minutes | 1.14 | 48 | 2,660 | 120 |
| 29 | 60 | no additional external supply of heat; 2 minutes | 1.26 | 57 | 2,820 | 130 |
| 30 | 100 | no additional external supply of heat; 1 minute | 1.60 | 131 | 2,850 | 144 |

When a polyether-polyol based on dipropylene glycol and having a functionality of two, a molecular weight of 400 and a hydroxyl number of 250-200 (Pluracol ® P 1010 from Ugine Kuhlmann) is employed in place of the polyether-polyol used in resin component I, i.e. the polyether-polyol described in Examples 10-15, but in other respects the procedure is identical to that in Examples 24-30, cast sheets are obtained which have the following properties:

Continuation of Table 4

| Example No. | Mould temperature during casting °C. | Type of curing | Impact strength J cm$^{-2}$ | Flexural strength N mm$^{-2}$ | Modulus of elasticity N mm$^{-2}$ | T$_G$ max °C. (modulus of shear) |
|---|---|---|---|---|---|---|
| 31 | room temperature | 1 hour in an oven at 150° C. | 0.95 | 96 | 2,750 | 95 |
| 32 | 100 | no external supply of heat; 5 minutes | 0.24 | 57 | 2,040 | 65 |

Examples 33-35 (ternary systems)

In each case 100 parts by weight (g) of the epoxide resin mixture described in Examples 23-26 are mixed with 40 parts by weight (g) of the diphenylmethane diisocyanate described in Example 1 and 5-10% of a physical blowing agent of the trichloromonofluoromethane type are added to the mixture.

In each case 22 parts by weight (g) of the polyether-polyol indicated in Examples 10 to 15, which contains 2.22% of boron trifluoride dihydrate (BF$_3$.2H$_2$O) as the catalyst, are now added, intensive mixing is carried out for 30-45 seconds with a high-speed stirrer and the composition is poured into a closable steel mould (200×150×20 mm; 11.3 kg) which has been prewarmed to 35° C.; the amount filled into the mould is varied in accordance with the desired specific weight. After the exothermic reaction has subsided, the castings are released from the mould and rigid foams with the following properties result.

Table 5

| Example No. | Density g/cm³ | Compressive strength N mm⁻² | Flexural strength N mm⁻² | Deflection mm | Modulus of elasticity N mm⁻² | $T_G$ max °C. (modulus of shear) | GTT °C. |
|---|---|---|---|---|---|---|---|
| 33 | 0.7 | 22–28 | 20 | 2 | 800 | — | — |
| 34 | 0.5 | 10–15 | 18 | 3 | 620 | 137 | 115–150 |
| 35 | 0.3 | 6–3 | 5 | 3 | 175 | — | — |

In the experiments described above the mechanical values are determined according to the following DIN specifications:
Impact strength: according to DIN 53,453
Flexural strength: according to DIN 53,452
Modulus of elasticity: according to DIN 53,457
Modulus of shear: according to DIN 53,445

Examples 36 and 37 (ternary systems)

When, on the one hand, 20 parts by weight of a liquid polyepoxide resin of the type of the diglycidyl ether of bisphenol F having an epoxide equivalent of 175–190 and a viscosity at 25° C. of 5,500–8,500 cP are mixed with 20 parts by weight of a polyether-polyol which has a functionality of 3, a mean molecular weight of 385, a viscosity of 600 to 800 cP (25° C.) and a OH number between 363 and 396 and which has been obtained by reacting propylene oxide with trimethylolpropane in a molar ratio of 4.3:1 (resin component) and, on the other hand, the curing catalysts of Examples 2 and 14 are added, in the concentration indicated in these examples, to 20 parts by weight of diphenylmethane diisocyanate (curing agent component) and the two components are then mixed well, systems result which have the following properties indicated in Table 6.

Table 6

| Example No | Curing catalyst corresponding to Example No. | Gel time pot-life | Maximum temperature rise °C./minutes or seconds | GTT °C. | Assessment of the cured composition |
|---|---|---|---|---|---|
| 36 | 2 | 4 mins. 15 secs. | 200/6 mins. | 114 | homogeneous |
| 37 | 14 | 5 mins. 50 secs. | 200/6.5 mins. | 107 | homogeneous |

Examples 38 and 39 (ternary systems)

When, on the one hand, 30 parts by weight of the epoxide resin used according to Examples 36 and 37 are mixed with 21 parts by weight of polyether-polyester-polyol (Baygal® K 115 type from Bayer AG) with a functionality of 2, a hydroxyl number of 158 to 165 and viscosity of 2,500 cP (25° C.) (resin component) and, on the other hand, the catalysts of Examples 2 and 14 are added, in the concentration indicated in these examples, to 9 parts by weight of diphenylmethane diisocyanate (curing agent component) and the two components are then mixed well, systems result which have the following properties indicated in Table 7.

Table 7

| Example No. | Curing catalyst corresponding to Example No. | Gel time pot-life | Maximum temperature rise °C./minutes | GTT °C. | Assessment of the cured composition |
|---|---|---|---|---|---|
| 38 | 2 | 1 min. 35 secs. | 180/5.5 | 63 | homogeneous |
| 39 | 14 | 2 mins. | 175/5.5 | 75 | homogeneous |

Example 40 (binary system)

The procedure of Example 2 is repeated except that "BF₃, 50% in tetrahydrofurane, and dibutyl-tin dilaurate" is used as the curing catalyst in place of "BF₃, 50% in tetrahydrofurane" and that 6 parts by weight of trichloromonofluoromethane are added as a foaming agent to the epoxide resin before the final reaction mixture is prepared. The mass begins to foam after about 4 minutes and after about 6 minutes a freely expanded foam with a volume of about 675 cm³ results. After the highly exothermic reaction (a temperature of 190° C. is measured inside the foam) has subsided, a relatively coarsepored, rigid, brittle structural foam with a density of 0.1–0.08 g/cm³ results. The glass transition temperature, measured with the Mettler 2000 DTA apparatus is ~140° C.

Example 41 (binary system)

80 parts by weight (g) of the diglycidyl ether based on bisphenol A used in Examples 10 to 15 are mixed well with 20 parts by weight (g) of trimethylhexamethylene diisocyanate, to which 0.25 part by weight (g) of BF₃ has been added beforehand in the form of a 25% tetrahydrofurfuryl alcohol complex. A liquid resin forms which has a pot-life of more than 1 hour at room temperature and which can be poured easily. After curing for 15 hours at b 150° C., a casting results which has a flexural strength of 92 N mm⁻², an impact strength of 0.76 N mm⁻², a modulus of elasticity of 3,000 N mm⁻² and a $T_G$ max (modulus of shear) of 90° C.

Example 42 (binary system with a long pot-life)

100 Parts by weight (g) of the diglycidyl ether based on bisphenol A used in Examples 10 to 15 are mixed well with 100 parts by weight (g) of a N-glycidyl compound which is based on dimethylhydantoin and has the formula

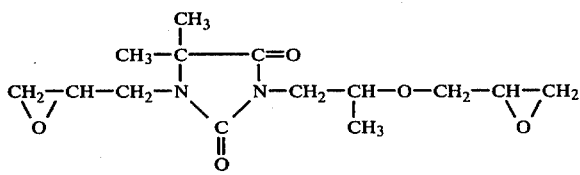

(6.38 epoxide equivalents/kg).

100 Parts by weight (g) of the diphenylmethane diisocyanate mentioned in Examples 1–9, to which 2.0 parts by weight (g) of BF₃, 50% in tetrahydrofurane, have been added beforehand, are now added to this mixture.

A liquid resin mixture is obtained which has a pot-life of more than 4 hours so that it can be exposed to a vacuum of about 0.1 mm Hg for ½–1 hour at room temperature without danger of gelling and can be cast bubble-free. After curing for 6 hours at 150° C., castings result which have a flexural strength of 111 N mm⁻², an impact strength of 16 KJ m$^{-2}$ (1.6 J cm$^{-2}$), a modulus of elasticity of 3,320 N mm$^{-2}$ and a T$_G$ max (modulus of shear) of 165° C.

Example 43 (ternary system with a long pot-life)

The procedure is analogous to that in Example 42 except that 75 parts by weight (g) of the diglycidyl ether based on bisphenol A described in Examples 10–15 are mixed well with 75 parts by weight (g) of the dimethylhydantoin-N-glycidyl compound described in Example 42 and 75 parts by weight (g) of the polyol described in Examples 10–15.

75 Parts by weight (g) of the diphenylmethane diisocyanate described in Examples 1–9, to which 1.5 parts by weight (g) of BF$_3$, 50% in tetrahydrofurane, have been added beforehand, are now added to this mixture.

A liquid resin mixture is obtained which has a pot-life of more than 4 hours, so that it can be exposed to a vacuum of 0.1 mm Hg for ½–1 hour at room temperature without danger of gelling and can be cast bubble-free. After curing for 6 hours at 150° C., castings result which have a flexural strength of 122 N mm$^{-2}$, an impact strength of 21 KJ m$^{-2}$ (0.21 J cm$^{-2}$), a modulus of elasticity of 2,690 N mm$^{-2}$ and a T$_G$ max (modulus of shear) of 125° C.

Example 44 (ternary system with a long pot-life)

The procedure is analogous to that in Example 43, the sole difference being that the N-glycidyl compound of methylethylhydantoin, which has the formula

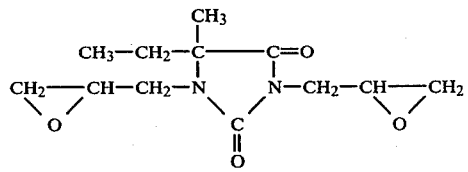

is employed in place of the hydantoin-N-glycidyl compound described in the said example. (More details regarding the product used in this example are published in AT Pat. No. 270,666).

A cast resin results which has a flexural strength of 119 N mm$^{-2}$, an impact strength of 29 KJ m$^{-2}$, a modulus of elasticity of 2,590 N mm$^{-2}$ and a T$_G$ max (modulus of shear) of 140° C.

Tests to determine the electric properties of such castings gave the following results:

| Dielectric loss factor tg δ . 10$^2$ (DIN 53,483) | (50 Hz/1,000 V, room temperature) | 0.42 |
|---|---|---|
| | 90° C. | 2.32 |
| | 100° C. | 6.08 |
| Dielectric constant (DIN 53,483) | room temperature | 3.7 |
| | 90° C. | 4.0 |
| | 100° C. | 4.4 |
| Volume resistivity ρ$_D$ (DIN 53,482) | room temperature | 2.7 × 10$^{16}$ |
| | 90° C. | 7.8 × 10$^{12}$ |
| | 100° C. | 9.8 × 10$^{11}$ |
| Tracking resistance (KA method) (DIN 53,480) | KA level | 3 C |

Example 45 (ternary system with a long pot-life and low flammability)

The procedure is analogous to that in Example 43 except that a mixture of 18.75 parts by weight (g) of the methylethylhydantoin-N-glycidyl compound mentioned in Example 44 with 56.25 parts by weight (g) of a tetrabromoimidazolone diglycidyl ester of the formula

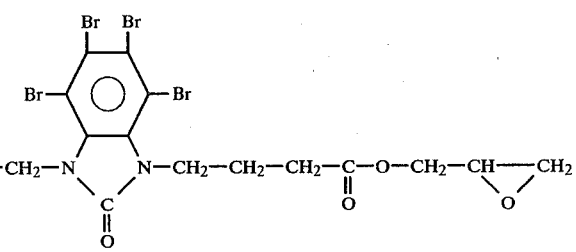

is employed in place of the hydantoin-N-glycidyl compound described in the said example. The product used has a melting point of 86°–92.5° C. and an epoxide equivalent weight of 440, or an epoxide content of 2.28 mols, which corresponds to 84% of theory, and the bromine content is 42%. The tetrabromo derivative is dissolved in the other epoxide and polyol components at slightly elevated temperature, with good stirring.

75 Parts by weight (g) of the diphenylmethane diisocyanate described in Examples 1–9, to which 1.5 parts by weight (g) of BF$_3$, 50% in tetrahydrofurane, have been added beforehand, are now added to this mixture at room temperature.

A liquid resin mixture is obtained which has a pot-life of more than 4 hours, so that it can be exposed to a vacuum of 0.1 mm Hg for ½–1 hour at room temperature without danger of gelling and can be cast bubble-free. After curing for 6 hours at 150°, castings result which have a flexural strength of 124 N mm$^{-2}$, an impact strength of 33 KJ m$^{-2}$ (3.3 J cm$^{-2}$), a modulus of elasticity of 2,610 N mm$^{-2}$ and a T$_G$ max (modulus of shear) of 130° C.

The flammability, tested in accordance with UL 94, is:

Level 94 V-O
Burning time seconds 0
Burning away mm 0.

Example 46

The procedure is analogous to that in Examples 38 and 39 except that the components mentioned are each employed in five times the amount (parts by weight) and that, furthermore, in place of the curing catalysts described in theses examples, the curing catalyst described in Example 20 is chosen (2.0 parts by weight (g) of 25% BF$_3$ in tetrahydropyrane).

After mixing at room temperature, any volatile constituents are removed in vacuo (0.1 mm Hg) in the course of 12 minutes and the composition is poured into moulds at room temperature and then cured for 7 hours at 150° C. Bubble-free transparent castings result. The properties of these castings are illustrated in Table 8.

Example 47

The procedure described in Example 46 is repeated except that the epoxide resin and the curing catalyst are omitted but, in place of these, 14 parts by weight (g) of Zeolitpaste ® (Bayer) (sodium aluminium silicate, 50% in castor oil) are added to Baygal K 155 ® and curing is carried out at room temperature for 16 hours and then at 120° C. for 1 hour. Opaque bubble-free castings result which have the properties illustrated in Table 9.

Table 8

| Test criterion: | Days | Storage temperature °C. | | |
|---|---|---|---|---|
| | | 125 | 150 | 175 |
| GTT (°C.) | 0 | 56 | 56 | 56 |
| | 1 | 55 | 54 | 59 |
| DTA-Mettler 1000 | 3 | 52 | 54 | 56 |
| | 7 | 56 | 59 | 57 |
| | 14 | 59 | 57 | 58 |
| | 28 | 56 | 56 | — |
| | 56 | 62 | 59 | |
| | 112 | 60 | 57 | |
| | 224 | 57 | 57 | |
| Loss in weight (%) | 1 | 0.30 | 0.45 | 0.73 |
| for a DIN bar | 3 | 0.42 | 0.61 | 0.97 |
| (120 × 15 × 10 mm) | 7 | 6.48 | 0.70 | 1.20 |
| | 14 | 0.57 | 0.77 | 1.54 |
| (Average figures | 28 | 0.60 | 0.90 | — |
| from 3 individual values) | 56 | 0.53 | 1.13 | |
| | 112 | 0.55 | 1.74 | |
| | 224 | 0.70 | 2.73 | |
| Flexural strength (mm) | 0 | 87 | 87 | 87 |
| VSM 77,103 | 1 | 96 | 101 | 103 |
| | 3 | 99 | 103 | 99 |
| (Average figures | 7 | 96 | 104 | 97 |
| from 3 individual values) | 14 | 104 | 110 | 100 |
| | 28 | 105 | 104 | — |
| | 56 | 115 | 101 | |
| | 112 | 115 | 110 | |
| | 224 | 119 | 56 | |
| Deflection (mm) | 0 | 15.0 | 15 | 15 |
| VSM 77,103 | 1 | 15.0 | 12.4 | 7.2 |
| | 3 | 12.6 | 9.1 | 5.7 |
| (Average figures | 7 | >17.4 | 9.1 | 5.9 |
| from 3 individual values) | 14 | 12.5 | 7.6 | 6.2 |
| | 28 | 10.2 | 5.8 | — |
| | 56 | 8.1 | 5.5 | |
| | 112 | 8.1 | 5.8 | |
| | 224 | 6.1 | 2.3 | |
| Impact strength VSM 77,105 | 0 | 28 (15–40) | | |

Table 9

| Test criterion: | Days | Storage temperature °C. | | |
|---|---|---|---|---|
| | | 125 | 150 | 172 |
| GTT (°C.) | 0 | 28 | 28 | 28 |
| | 1 | 30 | 37 | 35 |
| DTA-Mettler 1000 | 3 | 29 | 41 | 42 |
| | 7 | 34 | 42 | — |
| | 14 | 44 | 42 | |
| | 28 | 43 | 41 | |
| | 56 | — | — | |
| | 112 | | | |

Table 9-continued

| Test criterion: | Days | Storage temperature °C. | | |
|---|---|---|---|---|
| | | 125 | 150 | 172 |
| | 224 | | | |
| Loss in weight (%) | 1 | 0.72 | 1.56 | 2.85 |
| for a DIN bar | 3 | 1.02 | 2.06 | 3.36 |
| (120 × 15 × 10 mm) | 7 | 1.35 | 2.36 | 4.30 |
| | 14 | 1.61 | 2.62 | — |
| (Average figures | 28 | 2.06 | 3.20 | |
| from 3 individual values) | 56 | 2.21 | 4.33 | |
| | 112 | 2.64 | 7.36 | |
| | 224 | 3.36 | 9.92 | |
| Flexural strength (mm) | 0 | 6 | 6 | 6 |
| VSM 77,103 | 1 | 24 | 12 | 11 |
| | 3 | 22 | 18 | — |
| (Average figures | 7 | 25 | 26 | |
| from 3 individual values) | 14 | 31 | 26 | |
| | 28 | 40 | — | |
| | 56 | 44 | | |
| | 112 | — | | |
| | 224 | | | |
| Deflection (mm) | 0 | >20 | >20 | >20 |
| VSM 77,103 | 1 | >20 | >20 | ~4.4 |
| | 3 | >20 | ~8.7 | — |
| (Average figures | 7 | >20 | 5.8 | |
| from 3 individual values) | 14 | >20 | ~4.5 | |
| | 28 | 7.4 | — | |
| | 56 | 4.7 | | |
| | 112 | — | | |
| | 224 | | | |
| Impact strength VSM 77,105 | 0 | no break | | |

Examples 48 to 63 (addition of inert fillers and of fillers which lower the flammability)

The procedure is analogous to that described in Example 27 except that the dibutyl-tin dilaurate is omitted from the curing agent component II and, in place of this, the fillers listed below are added to the resin/curing agent mixture:

| Example No. | Type of filler | Amount (% by weight) |
|---|---|---|
| 48 | — | — |
| 49 | Barium sulphate | 25 |
| 50 | " | 50 |
| 51 | Quartz powder | 25 |
| 52 | " | 50 |
| 53 | Exolite 263 ® | 25 |
| 54 | " | 50 |
| 55 | Al$_2$O$_3$ . 3H$_2$O | 25 |
| 56 | " | 50 |
| 57 | Exolite 263 ® | 15 |
| 58 | Red phosphorus | 5 |
| 59 | " | |
| 60 | Microdol (Mg. . Ca carbonate) | 25 |
| 61 | " | 50 |
| 62 | Bromkal P 67 ® | 17 |
| 63 | " | 9 |

Exolite 263 is an ammonium polyphosphate $(NH_4PO_3)_n$; n = 700) from Hoechst AG.
Bromkal P 67 is a di-Br-propyltriphosphoric acid ester from Kalk in Cologne.

The size of the batches according to Examples 48 to 63 is 300 to 400 g. BF$_3$, 50% in tetrahydrofurane, is used. Curing: 1 hour at 150° C. The quantity ratios and the test results are listed in Table 10.

Table 10

| Example No. | 48 | 49 | 50 | 51 |
|---|---|---|---|---|
| Formulation | 45% of diglycidyl ether (B) 5% of diglycidyl ester (A) 17% of poly- | 34% of diglycidyl ether (B) 4% of diglycidyl ester (A) 12% of poly- | 22% of diglycidyl ether (B) 3% of diglycidyl ester (A) 8% of poly- | 34% of diglycidyl ether (B) 4% of diglycidyl ester (A) 12% of poly- |

Table 10-continued

| | | | | |
|---|---|---|---|---|
| | ether-polyol 33% of diisocyanate | ether-polyol 25% of diisocyanate | ether-polyol 17% of diisocyanate | ether-polyol 17% of diisocyanate |
| Additive | — | 25% of BaSO$_4$ | 50% of BaSO$_4$ | 25% of quartz powder |
| Total BF$_3$ content, % | 0.33 | 0.25 | 0.17 | 0.25 |
| Pot-life | 15–20' | 20–30' | 30–60' | 20–30' |
| Shore D hardness | 86 | 87 | 89 | 89 |
| Modulus of shear | 160 | 170 | 135 | 175 |
| T$_G$ max °C. | | | | |
| Impact strength, 12.1 KJ/m$^2$ | 9.5 | 1.5 | 9.0 | |
| Modulus of elasticity N/mm$^2$ | 2,710 | 3,290 | 4,250 | 3,760 |
| Flexural strength N/mm$^2$ | 108 | 66 | 41 | 68 |
| Stretching of the peripheral fibres % | 4.7 | 2.0 | 1.0 | 1.8 |
| Formulation | 45% of diglycidyl ether (B) 5% of diglycidyl ester (A) 17% of polyether-polyol 33% of diisocyanate | 34% of diglycidyl ether (B) 4% of diglycidyl ester (A) 12% of polyether-polyol 25% of diisocyanate | 22% of diglycidyl ether (B) 3% of diglycidyl ester (A) 8% of polyether-polyol 17% of diisocyanate | 34% of diglycidyl ether (B) 4% of diglycidyl ester (A) 12% of polyether-polyol 17% of diisocyanate |
| Additive | — | 25% of BaSO$_4$ | 50% of BaSO$_4$ | 25% of quartz powder |
| Flammability UL 94 (Underwriters Laboratories Standard) | | | | |
| Level | 94 V-O | 94 V-O | 94 HB | 94 V-O |
| Burning time secs. | 2.6 | 6.5 | 155 | 0.0 |
| Burning away mm | <25 | <25 | <25 | 0.0 |
| Remarks | | | | |

| Example No. | 52 | 53 | 54 | 55 |
|---|---|---|---|---|
| Formulation | 22% of diglycidyl ether (B) 3% of diglycidyl ester (A) 8% of polyether-polyol 17% of diisocyanate | 34% of diglycidyl ether (B) 4% of diglycidyl ester (A) 12% of polyether-polyol 25% of diisocyanate | 22% of diglycidyl ether (B) 3% of diglycidyl ester (A) 8% of polyether-polyol 17% of diisocyanate | 34% of diglycidyl ether (B) 4% of diglycidyl ester (A) 12% of polyether-polyol 25% of diisocyanate |
| Additive | 50% of quartz powder | 25% of Exolite 263 | 50% of Exolite 263 | 25% of DT 079* |
| Total BF$_3$ content, % | 0.17 | 0.25 | 0.17 | 0.25 |
| Pot-life | 20–30' | 20–30' | 30–60' | 15–20' |
| Shore D hardness | 92 | 87 | 90 | 87 |
| Modulus of shear T$_G$ max °C. | 165 | 173 | — | 170 |
| Impact strength KJ/m$^2$ | 2.4 | 12.3 | — | 6.6 |
| Modulus of elasticity N/mm$^2$ | 4,960 | 3,740 | — | 3,700 |
| Flexural strength N/mm$^2$ | 46 | 95 | — | 84 |
| Stretching of the peripheral fibres % | 0.7 | 2.8 | — | 2.6 |
| Formulation | 22% of diglycidyl ether (B) 3% of diglycidyl ester (A) 8% of polyether-polyol 17% of diisocyanate | 34% of diglycidyl ether (B) 4% of diglycidyl ester (A) 12% of polyether-polyol 25% of diisocyanate | 22% of diglycidyl ether (B) 3% of diglycidyl ester (A) 8% of polyether-polyol 17% of diisocyanate | 34% of diglycidyl ether (B) 4% of diglycidyl ester (A) 12% of polyether-polyol 25% of diisocyanate |
| Additive | 50% of quarts powder | 25% of Exolite 263 | 50% of Exolite 263 | 25% of DT 079* |
| Flammability UL 94 (Underwriters Laboratories Standard) | | | | |
| Level | 94 V-O | 94 V-O | — | 94 V-O |
| Burning time secs. | 0.0 | 0.0 | — | 0.0 |
| Burning away mm | 0.0 | 0.0. | — | 0.0 |
| Remarks | not bubble-free | | not bubble-free; too highly viscous; | * = aluminium oxide trihydrate |

| Example No. | 56 | 57 | 58 | 59 |
|---|---|---|---|---|
| Formulation | 22% of digly- | 39% of digly- | 43% of digly- | 44% of digly- |

Table 10-continued

| | | | | |
|---|---|---|---|---|
| | cidyl ether (B) 3% of diglycidyl ester (A) 8% of polyether-polyol 17% of diisocyanate | cidyl ether (B) 4% of diglycidyl ester (A) 14% of polyether-polyol 28% of diisocyanate | cidyl ether (B) 5% of diglycidyl ester (A) 16% of polyether-polyol 31% of diisocyanate | cidyl ether (B) 5% of diglycidyl ester (A) 16% of polyether-polyol 32% of diisocyanate |
| Additive | 50% of DT 079 | 15% of Exolite 263 | 5% of red phosphorus | 3% of red phosphorus |
| Total $BF_3$ content, % | 0.25 | 0.28 | 0.32 | 0.32 |
| Pot-life | 20–30' | 15–20' | 15–20' | 15–20' |
| Shore D hardness | 90 | 87 | 86 | 87 |
| Modulus of shear $T_G$ max °C. | 180 | 175 | — | 170 |
| Impact strength $KJ/m^2$ | 4.3 | 8.1 | — | 4.1 |
| Modulus of elasticity $N/mm^2$ | 5,820 | 3,240 | — | 2,940 |
| Flexural strength $N/mm^2$ | 66 | 78 | — | 76 |
| Stretching of the peripheral fibres % | 1.3 | 2.7 | — | 2.7 |
| Formulation | 22% of diglycidyl ether (B) 3% of diglycidyl ester (A) 8% of polyether-polyol 17% of diisocyanate | 39% of diglycidyl ether (B) 4% of diglycidyl ester (A) 14% of polyether-polyol 28% of diisocyanate | 43% of diglycidyl ether (B) 5% of diglycidyl ester (A) 16% of polyether-polyol 31% of diisocyanate | 44% of diglycidyl ether (B) 5% of diglycidyl ester (A) 16% of polyether-polyol 32% of diisocyanate |
| Additive | 50% of DT 079 | 15% of Exolite 263 | 5% of red phosphorus | 3% of red phosphorus |
| Flammability UL 94 (Underwriters Laboratories Standard) | | | | |
| Level | 94 V-O | 94 V-O | — | 94 V-O |
| Burning time secs. | 0.0 | 0.0 | — | 0.0 |
| Burning away mm | 0.0 | 0.0 | — | 0.0 |
| Remarks | | | cracks'. | |

| Example No. | 60 | 61 | 62 | 63 |
|---|---|---|---|---|
| Formulation | 34% of diglycidyl ether (B) 4% of diglycidyl ester (A) 12% of polyether-polyol 25% of diisocyanate | 22% of diglycidyl ether (B) 3% of diglycidyl ester (A) 8% of polyether-polyol 17% of diisocyanate | 45% of diglycidyl ether (B) 5% of diglycidyl ester (A) — 33% of diisocyanate | 45% of diglycidyl ether (B) 5% of diglycidyl ester (A) 8% of polyether-polyol 33% of diisocyanate |
| Additive | 25% of Microdol | 50% of Microdol | 17% of Bromkal P 67 | 9% of Bromkal P 67 |
| Total $BF_3$ content, % | 0.25 | 0.17 | 0.33 | 0.33 |
| Pot-life | 10–15' | 45–60' | 15–20' | 15–20' |
| Shore D hardness | 90 | — | — | — |
| Modulus of shear $T_G$ max °C. | 175 | 90 | 115 | 120 |
| Impact strength $KJ/m^2$ | 12.1 | 1.1 | 2.1 | 7.6 |
| Modulus of elasticity $N/mm^2$ | 3,570 | 3,770 | 800 | 2,940 |
| Flexural strength $N/mm^2$ | 75 | 21 | 16 | 126 |
| Stretching of the peripheral fibres % | 2.2 | 0.6 | 1.8 | 4.7 |
| Formulation | 34% of diglycidyl ether (B) 4% of diglycidyl ester (A) 12% of polyether-polyol 25% of diisocyanate | 22% of diglycidyl ether (B) 3% of diglycidyl ester (A) 8% of polyether-polyol 17% of diisocyanate | 45% of diglycidyl ether (B) 5% of diglycidyl ester (A) — 33% of diisocyanate | 45% of diglycidyl ether (B) 5% of diglycidyl ester (A) 8% of polyether-polyol 33% of diisocyanate |
| Additive | 25% of Microdol | 50% of Microdol | 17% of Bromkal P 67 | 9% of Bromkal P 67 |
| Flammability UL 94 (Underwriters Laboratories Standard) | | | | |
| Level | 94 HB | 94 V-0/94 V-1 | — | 94 V-0 |
| Burning time sec | 110 | 5 / 24 | — | 0.0 |
| Burning away mm | <25 | <25 /<25 | — | 0.0 |
| Remarks | foams on post- | very brittle | shrinkage | |

Table 10-continued

| curing: | (fractured) |
|---|---|

What is claimed is:

1. A process for the preparation of a crosslinked polymer which comprises reacting (a) a liquid epoxide compound containing at least two epoxide groups in the molecule, with (b) a polyisocyanate in such amounts that there are present 0.1 to 2.0 isocyanate groups per epoxide group; in the presence of 0.2 to 0.5% by weight of (a) plus (b) of a curing catalyst which is a complex compound of $BF_3$ with a member selected from the group consisting of tetrahydropyran and tetrahydrofuran and in the presence of (d) 0.0001 to 0.5% by weight of (a) plus (b) of a curing accelerator which is a compound of a metal selected from the group consisting of Sn, Zn and Fe, which is soluble in (a) and (b), at a temperature between room temperature and 250° C. wherein said process is conducted without the addition of external heat.

2. A process according to claim 1 which additionally contains (c) a polyhydroxy compound in such amounts that there are present 0.1 to 2.0 hydroxy groups per epoxide group and the amount of curing catalyst is 0.2 to 0.5% by weight of (a) plus (b) plus (c).

3. A process according to claim 1, which additionally contains a blowing agent for forming a foam.

4. A process according to claim 1, wherein the polyisocyanate is in such an amount so that there are 0.3 to 1.2 isocyanate groups per epoxide group.

5. A process according to claim 1 wherein (d) the compound of the metal is 0.0002 to 0.3% by weight of (a) plus (b).

6. A process according to claim 2 which additionally contains (d) 0.0001 to 0.5% by weight of (a) plus (b) plus (c) of a compound of a metal selected from the group consisting of Sn, Zn and Fe which is soluble in (a), (b) and (c).

7. A process according to claim 2 wherein the polyhydroxy compound is in such an amount so that there are present 0.2 to 1.0 hydroxy groups per epoxide group.

8. A process according to claim 6 wherein (d) the compound of the metal is 0.0002 to 0.3% by weight of (a) plus (b) plus (c).

9. A process according to claims 1, 2, or 6 wherein the curing catalyst is the complex compound of $BF_3$ with tetrahydrofuran.

10. A process according to claims 1, 2, or 6 wherein the curing catalyst is the complex compound of $BF_3$ with tetrahydropyran.

11. A process according to claim 6 wherein (d) the compound of the metal is dibutyl-tin dilaurate.

12. A crosslinked polymer prepared by the process of claims 1, 2, or 6.

* * * * *